United States Patent
Shimoi et al.

(10) Patent No.: US 7,588,855 B2
(45) Date of Patent: Sep. 15, 2009

(54) FUEL CELL ASSEMBLY AND FUEL CELL SYSTEM

(75) Inventors: Ryouichi Shimoi, Yokohama (JP); Kazuhiko Shinohara, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 335 days.

(21) Appl. No.: 10/552,260

(22) PCT Filed: Mar. 19, 2004

(86) PCT No.: PCT/JP2004/003781

§ 371 (c)(1),
(2), (4) Date: Oct. 5, 2005

(87) PCT Pub. No.: WO2004/097965

PCT Pub. Date: Nov. 11, 2004

(65) Prior Publication Data

US 2006/0194090 A1    Aug. 31, 2006

(30) Foreign Application Priority Data

Apr. 28, 2003    (JP) ............................... 2003-123673

(51) Int. Cl.
*H01M 2/14* (2006.01)
*H01M 8/04* (2006.01)
(52) U.S. Cl. ................................ 429/38; 429/24; 429/26
(58) Field of Classification Search .................... 429/38, 429/39, 34, 26, 25, 24
See application file for complete search history.

(56) References Cited

U.S. PATENT DOCUMENTS

| | | | | |
|---|---|---|---|---|
| 5,132,174 A | * | 7/1992 | Romanowski et al. | ........ 429/26 |
| 6,103,410 A | | 8/2000 | Fuller et al. | |
| 6,124,051 A | * | 9/2000 | Johnson | ........ 429/26 |
| 6,248,462 B1 | | 6/2001 | Bonville | |
| 6,358,638 B1 | | 3/2002 | Rock et al. | |
| 2002/0071972 A1 | | 6/2002 | Gebhardt et al. | |
| 2003/0077487 A1 | | 4/2003 | Roberts et al. | |

FOREIGN PATENT DOCUMENTS

| | | |
|---|---|---|
| JP | 1-265460 A | 10/1989 |
| WO | WO 01/48846 A1 | 7/2001 |

* cited by examiner

*Primary Examiner*—Patrick Ryan
*Assistant Examiner*—Thomas H. Parsons
(74) *Attorney, Agent, or Firm*—McDermott Will & Emery LLP

(57) ABSTRACT

A fuel cell assembly (1) is disclosed. The fuel cell assembly (1) has a fuel cell stack (2) formed by laminating a plurality of cells; plus and minus current extraction sections (4), the current extraction sections (4) extracting current generated by the fuel cell stack and sandwiching the fuel cell stack with respect to the direction of lamination; and a passage (4a) allowing flow of a fluid provided in at least one of the current extraction sections. Further a fuel cell system, which has the above fuel cell stack and a heating device (24, 26, 32, 90) for heating the passage for the fluid, is disclosed.

18 Claims, 7 Drawing Sheets

FUEL CELL ASSEMBLY AND FUEL CELL SYSTEM

RELATED APPLICATION

This application is the U.S. National Phase under 35 U.S.C. § 371 of International Application No. PCT/JP2004/003781, filed Mar. 19, 2004, which in turn claims the benefit of Japanese Application No. 2003-123673, filed Apr. 28, 2003, the disclosures of which Applications are incorporated by reference herein in their entirety.

FIELD OF THE INVENTION

This invention relates to a fuel cell assembly and a fuel cell system.

BACKGROUND OF THE INVENTION

During a cold startup of a fuel cell stack at a temperature below freezing, it is not possible to extract a desired power generation amount from the fuel cell stack because moisture which was previously produced in the fuel cell during power generation freezes. Even if fuel gas is supplied to the fuel stack, since the reaction face (or membrane electrode assembly) is covered with ice, it is impossible to supply the reaction face with a sufficient amount of fuel gas. U.S. Pat. No. 6,358,638B1 and 6,103,410 disclose a technique for improving startup of a cell fuel stack at a temperature below freezing. The technique disclosed in U.S. Pat. No. 6,358,638B1 melts ice using combustion heat produced in a fuel cell by allowing a small amount of hydrogen or air to flow into the anode or the cathode. The technique disclosed in U.S. Pat. No. 6,103,410 promotes melting of ice in the fuel cell stack by introducing a gaseous mixture of hydrogen gas and air into the cathode and thus performing catalytic combustion of the gaseous mixture in the cathode.

SUMMARY OF THE INVENTION

However the conventional techniques above can be characterized in that immediately after startup, heat for heating the end cell positioned on both ends of the fuel cell stack is used up as a result of heating the end plate or the current extraction plate positioned on both ends of the fuel cell stack. Consequently it is not possible to heat the end cell sufficiently. As a result, the power generation state of the end cell is conspicuously lower than other cells.

It is therefore an object of this invention to improve startup of the end cell in the fuel cell stack under cold conditions at a temperature below freezing.

In order to achieve the above object, this invention provides a fuel cell assembly comprising a fuel cell stack formed by laminating a plurality of cells; plus and minus current extraction sections, the current extraction sections extracting current generated by the fuel cell stack and sandwiching the fuel cell stack with respect to the direction of lamination; and a passage allowing flow of a fluid provided in at least one of the current extraction sections.

Further, this invention provides a fuel cell system comprising the above fuel cell assembly and a heating device for heating the passage for the fluid.

Furthermore, this invention provides a fuel cell assembly comprising a fuel cell stack formed by laminating a plurality of cells; plus and minus current extraction sections, the current extraction sections extracting current generated by the fuel cell stack and sandwiching the fuel cell stack with respect to the direction of lamination; and an enclosed cavity for confining fluid therein formed in at least one of the current extraction sections.

The details as well as other features and advantages of this invention are set forth in the remainder of the specification and are shown in the accompanying drawings.

DESCRIPTION OF TIE PREFERRED EMBODIMENTS

Figure 1:
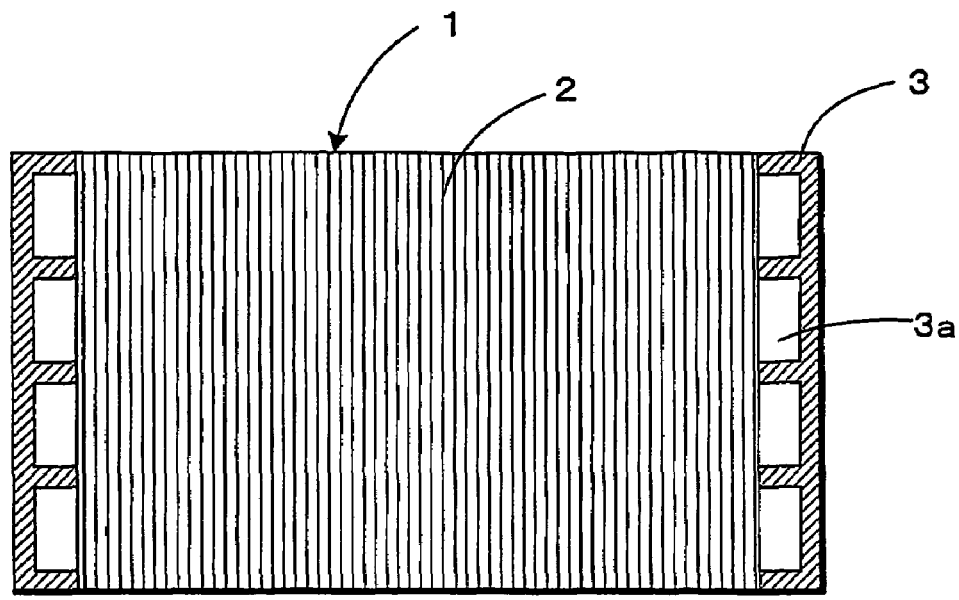
FIG. 1 is a sectional view of a fuel cell assembly according to a first embodiment.

Referring to FIG. 1 of the drawings, a first embodiment will be described. A fuel cell assembly 1 comprises a fuel cell stack 2 formed by laminating a plurality of cells and plus and minus current extraction sections 3 sandwiching the fuel cell stack 2 with respect to the direction of lamination of the fuel cell stack 2. The cell includes a membrane electrode assembly (MEA) and a separator which forms one or more passages allowing the supply of oxygen or hydrogen to the anode or the cathode. The MEA comprises a polymer electrolyte membrane, a gas diffusion electrode acting as a cathode and a gas diffusion electrode acting as an anode.

The current extraction section 3 has an integrated structure in which the current extraction plate and the end plate are integrated. The end plate presses uniformly the cells of the fuel cell stack 2 to bind them in the direction of lamination. The current extraction plate extracts current produced in the fuel cell assembly 1 to the outside. The current extraction section 3 incorporates both the function of the current extraction plate and the end plate. The end plate may be realized by a plate connected with the connector of the cooling medium passage or the gas distribution passage and it may function as an electrically insulating member.

As shown in some embodiments described hereafter, when the end plate and the current extraction plate are provided as separate units in contrast to this embodiment, it is possible to improve the thermal insulation of the fuel cell assembly 1 under normal operating conditions after startup since materials having different coefficients of thermal conductivity are used in the current extraction plate and the end plate. More precisely, the end plate may be formed from a material which has a lower coefficient of thermal conductivity than that of the current extraction section.

One side of the current extraction section 3 has an indented section 3a which acts as a passage allowing flow of a heating medium (for example a gas such as air or hydrogen). The open side of the indented section 3a is disposed facing the fuel cell stack 2. Rather than a gas, the heating medium may comprise a liquid such as cooling water used for cooling the fuel cell stack 2 under normal operating conditions.

The flow of gas in the current extraction section 3 reduces the overall heat capacity of the current extraction section 3. Further the thermal insulation characteristics of the gas interfere with the transmission of heat from the laminated cell 2 to the current extraction section 3. In this manner, heat of the end cell can be prevented from being deprived by the current extraction section 3 during cold startup at a temperature below freezing. Furthermore it is possible to rapidly increase the temperature of the end cell positioned on the end of the laminated cell 2. Furthermore it is possible to improve the power generation conditions of the fuel cell stack during startup at a temperature below freezing.

Figure 2:
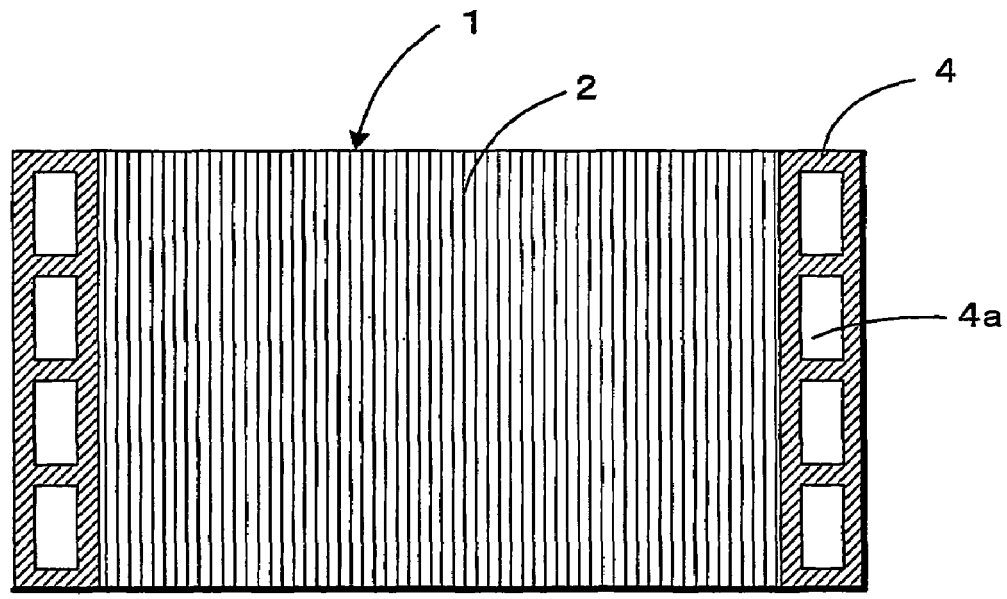
FIG. 2 is a sectional view of a fuel cell assembly according to a second embodiment.

Referring to FIG. 2, the fuel cell assembly 1 according to a second embodiment will be described. The structure of the current extraction section is different to that described in the first embodiment.

The current extraction section 4 has a passage 4a (or open cavity) allowing gas flow inside the current extraction section 4. This type of structure ensures the rigidity of the current extraction section in addition to obtaining the effect of the first embodiment. Furthermore the structure effectively fixes the fuel cell stack 2 and improves the air-tight characteristics of the passage 4a.

Figure 3:
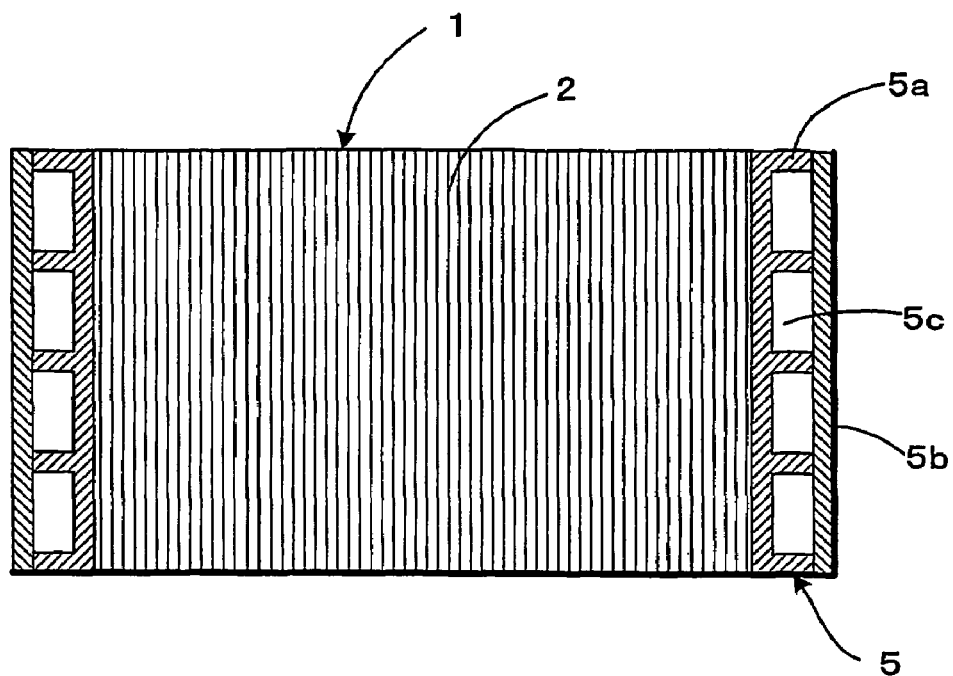
FIG. 3 is a sectional view of a fuel cell assembly according to a third embodiment.

Referring to FIG. 3, the structure of the fuel cell assembly 1 according to a third embodiment will be described. The current extraction section 5 comprises a current extraction plate 5a and an end plate 5b. The current extraction section and the end plate are provided as separate components. Thus it is possible to improve the thermal insulation of the fuel cell assembly 1 by forming the end plate 5b with a material which has a lower coefficient of thermal conductivity than the material used in the current extraction plate 5a. One side of the current extraction plate 5a is fixed to the end face of the fuel cell stack 2 with respect to the direction of lamination. An indented section 5c is formed on the other side of the current extraction plate 5a to allow gas flow. The end plate 5b seals the opening of the indented section 5c. In this manner, gas flow is enabled in the indented section 5c. Therefore this structure makes it possible to form a passage for gas flow in a simple manner.

Figure 4:
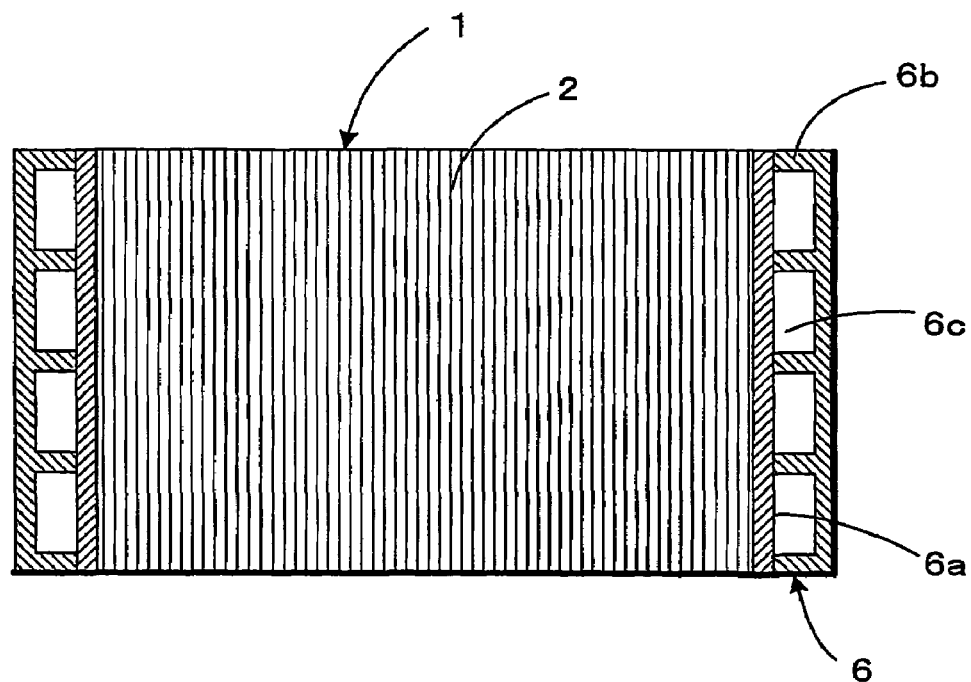
FIG. 4 is a sectional view of a fuel cell assembly according to a fourth embodiment.

Referring to FIG. 4, the fuel cell assembly 1 according to a fourth embodiment will be described. The current extraction section 6 comprises a current extraction plate 6a and an end plate 6b. The current extraction plate 6a is formed as a flat plate and is affixed to the fuel cell stack 2. The indented section 6c is adapted to allow gas flow on one side of the end plate 6b. The current extraction plate 6a seals the opening of the indented section 6c. Thus gas flow can be realized in the indented section 6c. Thus this structure realizes the same effect as that obtained by the third embodiment.

Figure 5:
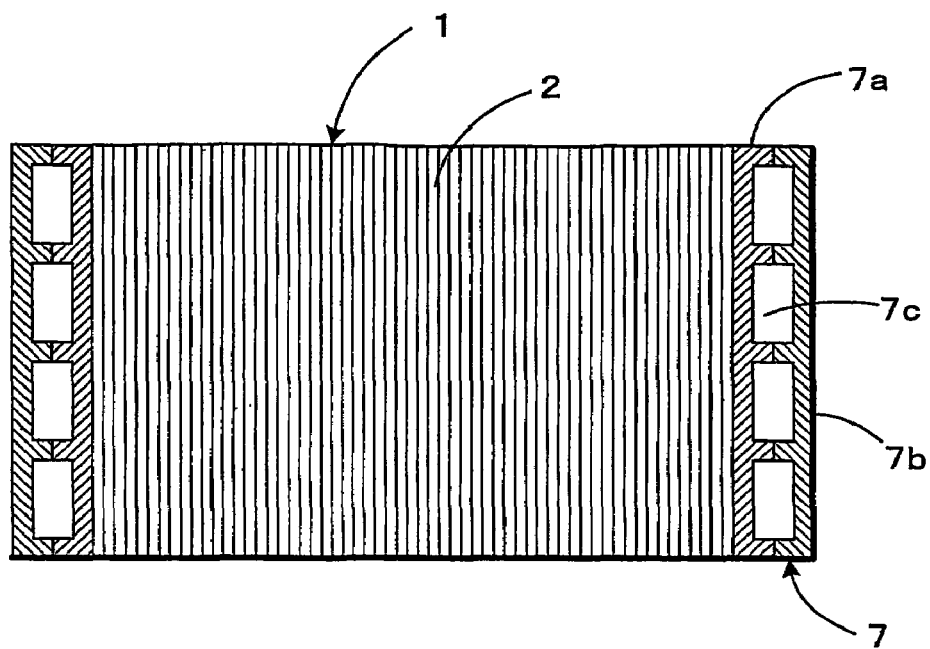
FIG. 5 is a sectional view of a fuel cell assembly according to a fifth embodiment.

Referring to FIG. 5, a fuel cell assembly 1 according to a fifth embodiment will be described. The current extraction section 7 comprises a current extraction plate 7a and an end plate 7b. Both the current extraction plate 7a and an end plate 7b have an indented section on one side. The openings of both indented sections face one another to form the space 7c. Gas flows into the space 7c formed by the openings. This structure realizes the same effect as that obtained by the third and fourth embodiments.

Figure 6:
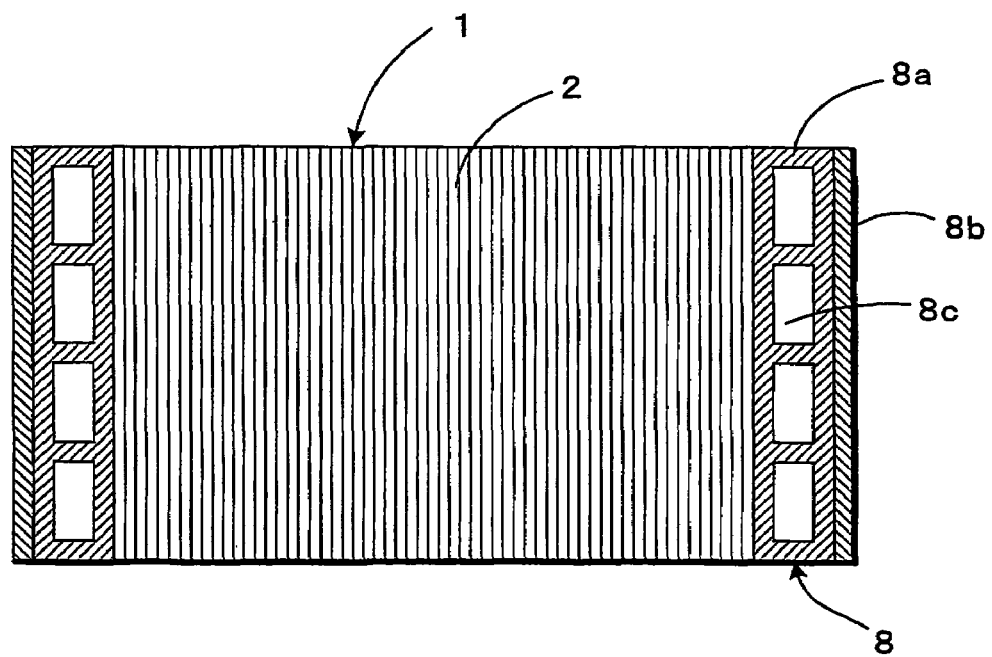
FIG. 6 is a sectional view of a fuel cell assembly according to a sixth embodiment.

Referring to FIG. 6, a fuel cell assembly 1 according to a sixth embodiment will be described. The current extraction section 8 comprises a current extraction plate 8a and an end plate 8b. The current extraction plate 8a comprises a passage 8c (or open cavity) allowing gas flow therein. The end plate 8b is a flat plate. Since the current extraction plate 8a has a passage 8c therein, the same effect as the second embodiment is obtained. The current extraction section 8 further comprises an end plate 8b. It is possible to improve thermal insulation of the fuel cell assembly 1 if the end plate 8b is formed from a material which has a lower coefficient of thermal conductivity than the material for forming the current extraction plate 8a. Furthermore it is possible to improve thermal insulation by using an insulating material as the material for forming the end plate 8b.

Figure 7:
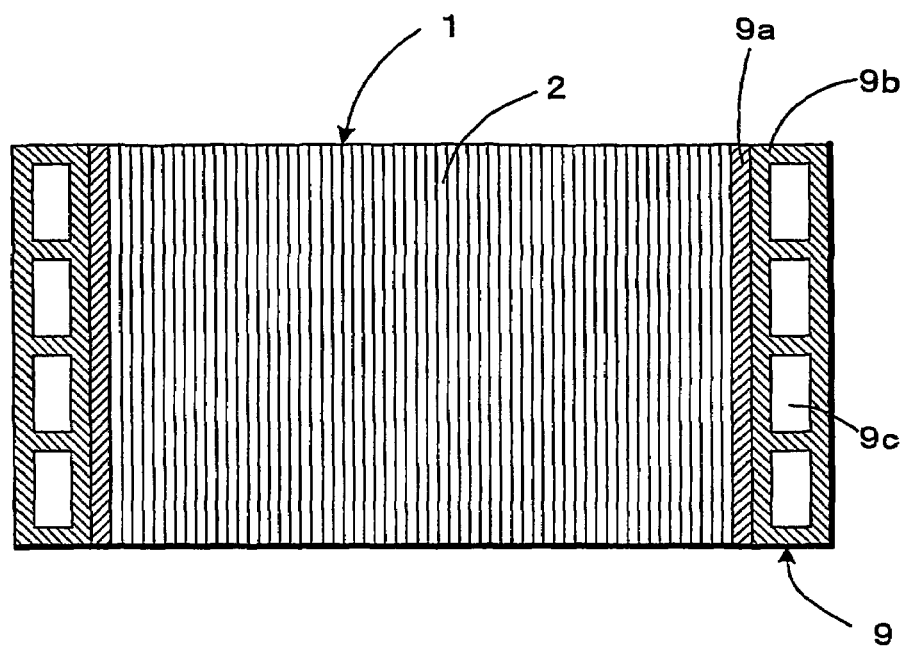
FIG. 7 is a sectional view of a fuel cell assembly according to a seventh embodiment.

Referring to FIG. 7, a fuel cell assembly 1 according a seventh embodiment will be described. A current extraction section 9 comprises a current extraction plate 9a and an end plate 9b. The current extraction plate 9a is a flat plate. The end plate 9b comprises a passage 9c allowing gas flow therein. This structure realizes the same effect as the sixth embodiment.

Figure 8:
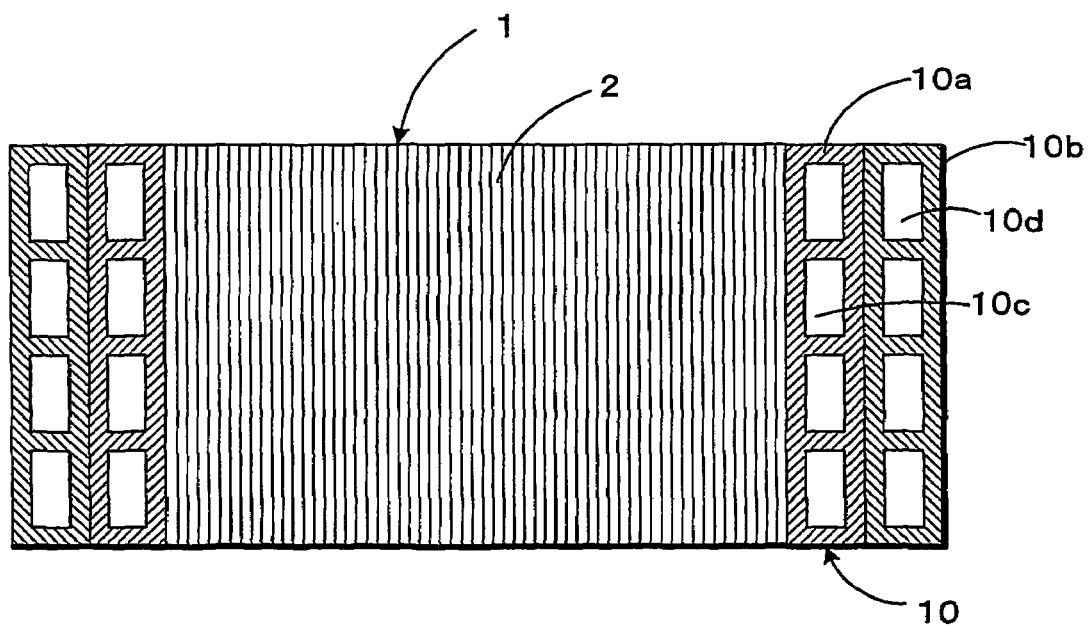
FIG. 8 is a sectional view of a fuel cell assembly according to an eighth embodiment.

Referring to FIG. 8, a fuel cell assembly 1 according an eighth embodiment will be described. A current extraction section 10 comprises a current extraction plate 10a and an end plate 10b. The current extraction plate 10a and the end plate 10b comprise passages 10c, 10d allowing gas flow therein. This structure realizes the same effect as the sixth and seventh embodiments.

As shown by the third through the eighth embodiments, the heat capacity of the current extraction section is reduced in the same manner as the first and the second embodiments by allowing gas flow in the current extraction section which comprises a current extraction plate and an end plate. In this manner, during startup at a temperature below freezing, it is possible to avoid heat being taken by the current extraction section and to promote temperature increase in the end cell. Furthermore it is possible to improve the power generation conditions of the fuel cell stack during startup at a temperature below freezing.

An enclosed cavity which has any type of gas-tight structure and confines gas therein may be used instead of any passage shown in the first to eighth embodiments. It is preferred that the gas is sealed in the enclosed cavity at a reduced pressure.

Figure 9:
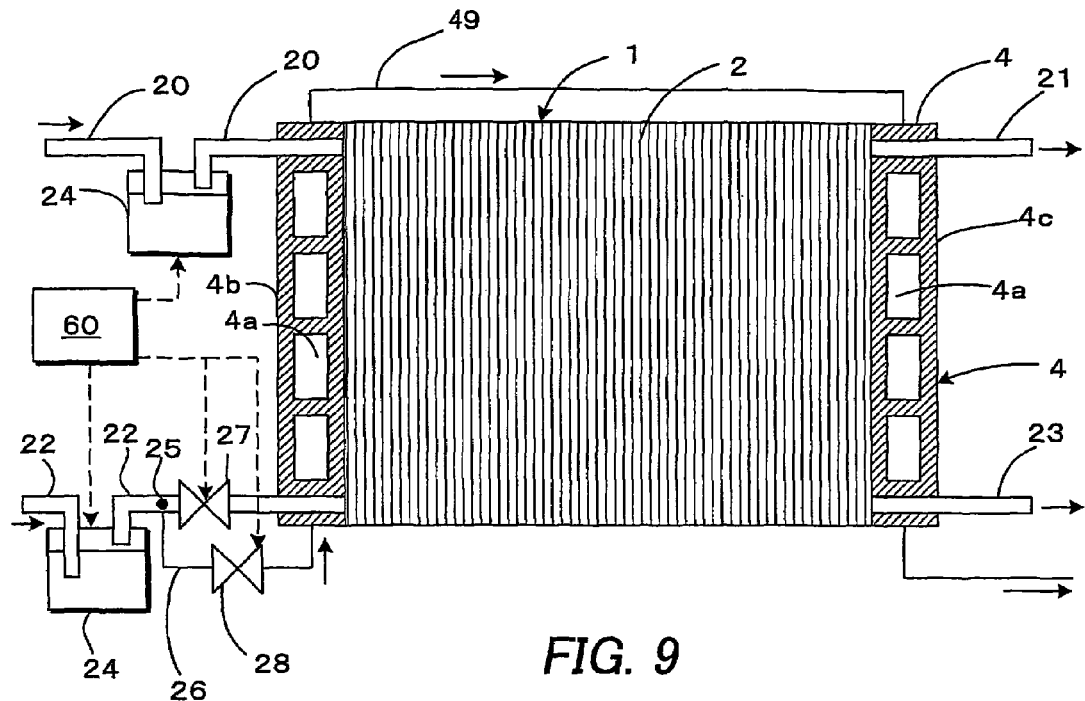
FIG. 9 is a schematic diagram of a fuel cell system according to a ninth embodiment.

Referring to FIG. 9, a ninth embodiment will be described. This embodiment relates to a fuel cell system. Although the fuel cell assembly 1 has the same structure as that described with reference to the second embodiment, any structure in the embodiments above will suffice.

An anode intake pipe 20 supplies hydrogen to the anode of each cell of the fuel cell stack 2. The anode outlet pipe 21 discharges hydrogen effluent from each cell of the fuel cell stack 2 to the external atmosphere. The cathode inlet pipe 22 supplies air or an oxygen-containing gas to the cathode of each cell. The cathode outlet pipe 23 discharges effluent air or discharge gas discharged from each cell to the external atmosphere.

A humidifier 24 functioning as a heating device is disposed respectively in the anode intake pipe 20 and the cathode intake pipe 22. Air and hydrogen is supplied to the cell after being heated to a predetermined temperature by the humidifier 24. A bypass pipe 26 branches at a branching point 25 downstream of the humidifier 24 of the cathode inlet pipe 22. The bypass pipe 26 is connected to the upstream current extraction section 4b which is disposed upstream from the downstream current extraction section 4c. A control valve 27 is disposed downstream of the branching point 25 of the cathode inlet pipe 22. A control valve 28 is disposed in the bypass pipe 26 between the branching point 25 and the upstream current extraction section 4b. The air supplied through the bypass pipe 26 passes through the passage 4a of the upstream current extraction section 4b and is supplied to the downstream current extraction section 4c after passing through a pipe 49. Air discharged from the downstream current extraction section 4c is discharged to the external atmosphere.

The control valves 27, 28 are opened and closed by a controller 60. The humidifier 24 is also controlled by the controller 60. The controller 60 comprises a microcomputer provided with a central processing unit (CPU) executing programs, a read-only memory (ROM) storing data or programs, a random access memory (RAM) temporarily storing obtained data as well as calculation results from the CPU and an input/output interface (I/O interface).

In order to increase the temperature of the current extraction section 4, air heated by the humidifier 24 is supplied to the current extraction section 4 through a control valve 28. In addition, heated air passing through the control valve 27 is supplied to the cells. Furthermore hydrogen is supplied to the cells and power generation operations are commenced in each cell. Thus when startup is performed below freezing, the humidifier 24 heats the current extraction section 4 by allowing heated air to flow through the current extraction section 4. Radiation of heat from the current extraction section 4 promotes temperature increase in the end cell which tends to display a low power generation efficiency at low temperatures. The temperature increase in the end cell makes the overall temperature of the fuel cell stack 2 uniform and improves power generation efficiency. Before power generation operations are commenced in the fuel cells, heated air may be supplied to the current extraction section 4 by closing the control valve 27 and opening the control valve 28 in order to increase the temperature of the end cell before power generation.

It is stressed that the heating device is not limited to the humidifier 24 but may be a compressor, a combustor or a gas heater. Apart from high temperature gas, the current extraction section may be heated by allowing a high-temperature liquid to flow in the passage.

When the fuel cell stack is operating under normal conditions after startup, sufficient air is supplied to the fuel cell stack 2 by closing the control valve 28 since it is not necessary to heat the end cell. Furthermore when the fuel cell stack has reached a higher temperature than the temperature of the supplied air, the temperature of the fuel cell stack may be reduced by opening the control valve 28 in order to limit the air supplied to the fuel cell stack 2.

Figure 10:
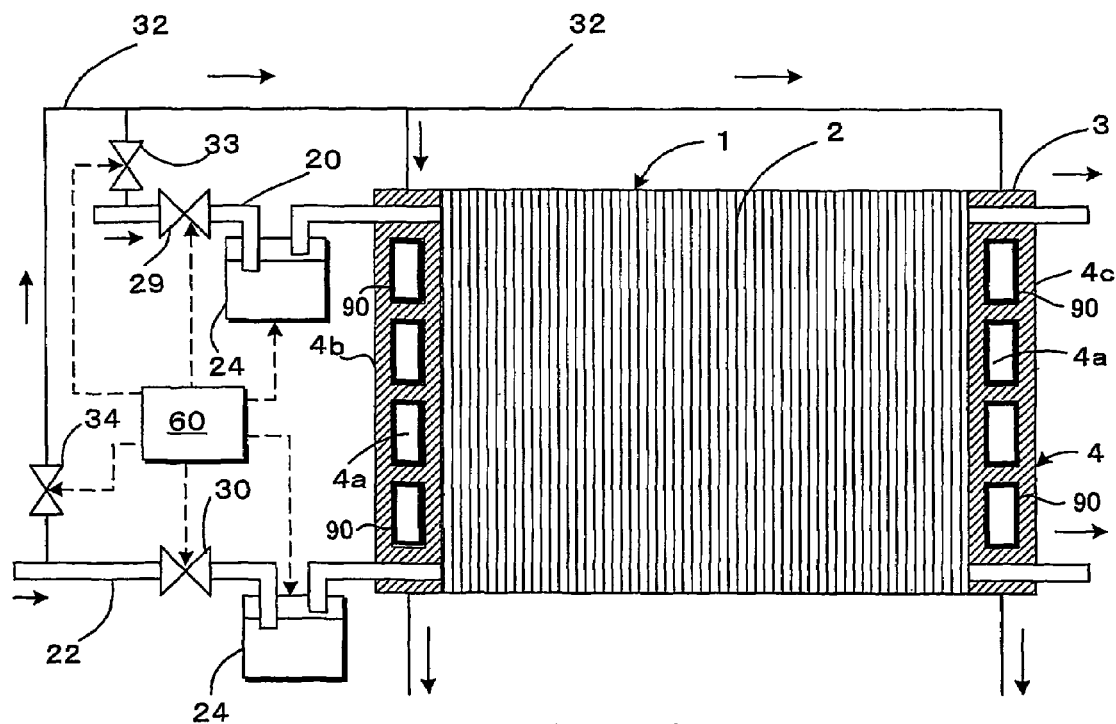
FIG. 10 is a schematic diagram of a fuel cell system according to a tenth embodiment.

Referring to FIG. 10, a fuel cell system according to a tenth embodiment will be described. When compared to the fuel cell according to the ninth embodiment, the tenth embodiment omits the bypass pipe 26 and the control valves 27, 28. A control valve 29 is disposed in the anode intake pipe 20 upstream of the humidifier 24 and a control valve 30 is disposed in the cathode intake pipe 22 upstream of the humidifier 24. A gas pipe 32 branches from the intake pipes 20, 22 upstream of the control valves 29, 30. The gas pipe 32 is connected to the two current extraction sections 4b, 4c positioned on both ends of the fuel cell stack 2. A gaseous mixture of air and hydrogen is supplied to the current extraction section 4. The gaseous mixture is discharged to the external atmosphere after passing through the current extraction section 4. A control valves 33, 34 are disposed in the gas pipe 32 which branches from each intake pipe 20, 22. The control valve 33 regulates the flow of hydrogen supplied to the current extraction section 4. The control valve 34 regulates the flow of air supplied to the current extraction section 4. The control valves 29, 30, 33, 34 are opened and closed by the controller 60.

A catalyst 90 acting as a combustion means is applied to the wall face of the passage 4a of the current extraction section 4. The heat of combustion of the gaseous mixture is produced by catalytic reactions in the passage 4a as a result of supplying a gaseous mixture of hydrogen and oxygen to the passage 4a. The end cell is effectively heated by transmitted heat from the current extraction section 4 which directly generates heat by the catalyst 90. In the tenth embodiment, the heating device which heats the passage 4a of the current extraction section 4 comprises a gas pipe 32 supplying the gaseous mixture of air and hydrogen to the current extraction section 4 and a catalyst 90 provided in the passage 4a of the current extraction section 4.

Figure 12:
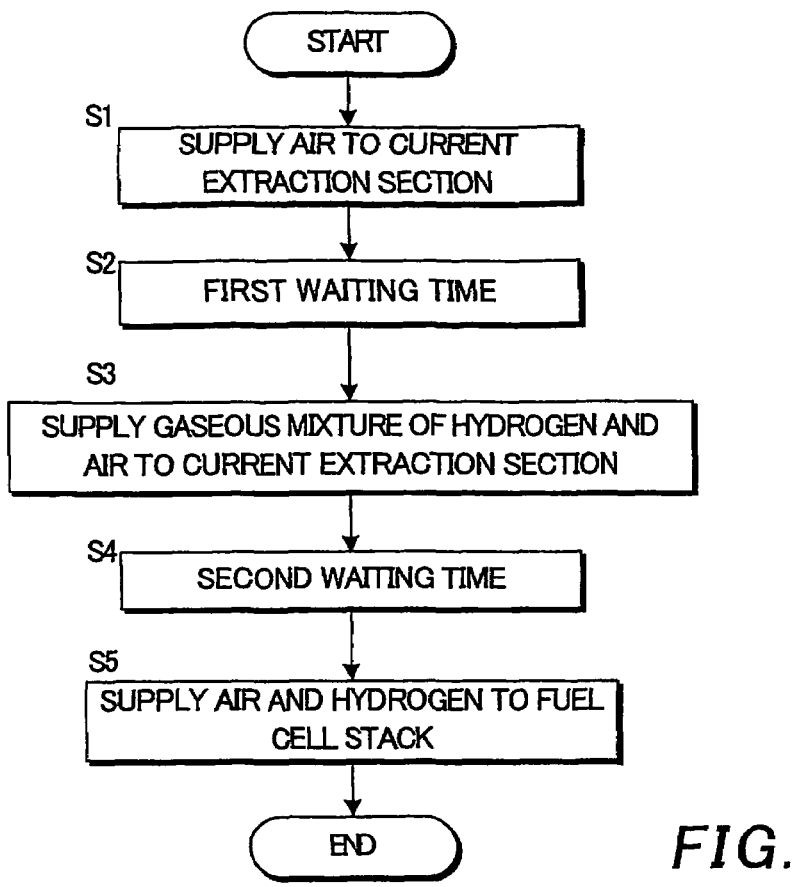
FIG. 12 is a flowchart describing an example of a startup control routine performed by a controller according to the tenth embodiment.

Referring to FIG. 12, an example of a startup control routine performed by the controller 60 according to the tenth embodiment will be described. Firstly in a step S1, the control valve 34 is opened before power generation operations and air is supplied at a flow rate of 10 liters per minute only to the current extraction section 4. Then in a step S2, a first waiting time is set. The first waiting time is predetermined as a time during which the temperature of the catalyst 90 applied to the passage 4a is increased to higher than a predetermined temperature (for example, to the catalyst activation temperature). The first waiting temperature may be predetermined as the time required for the flow rate of air to stabilize. After the first waiting time has elapsed, in a step S3, the control valve 33 is opened and hydrogen is supplied to the pipe 32 at a rate of 0.4 liters per minute. In this manner, a gaseous mixture of hydrogen and air passes through the passage 4a of the current extraction section 4 from the pipe 32.

The gaseous mixture of hydrogen and air is combusted by the catalyst 90 in the passage 4a The heat produced as a result of the catalytic combustion heats the end cell. In a step S4, a second waiting time is set. The second waiting time is predetermined as a time required for the temperature of the end cell to increase to a temperature 5 degrees C. to 10 degrees C. higher than that of the other cells. In a step S5, the control valves 29, 30 are opened. Air and hydrogen are supplied to the fuel cell stack 2. Consequently power generation is commenced in the fuel cell stack 2. This type of control allows the end cell to be heated by increasing the temperature of the current extraction section using the gaseous mixture of air and hydrogen which should have been supplied to the fuel cell stack 2.

During normal operation, the control valve 33 is closed and only the control valve 34 is opened. Consequently air from the gas pipe 32 effectively removes moisture produced by catalytic reactions in the passage 4a. This prevents moisture in the passage 4a from freezing at temperatures below zero and improves the startup performance at a temperature below freezing.

When the operation of the fuel cell system is stopped, the supply of the gaseous mixture of hydrogen and air may be continued to the current extraction section 4. Even when the temperature of the external atmosphere falls below zero while operation is stopped, it is possible to avoid the temperature of the fuel cell stack 2 from falling below freezing point by supplying the gaseous mixture. In this case, the startup control routine described above is not required.

Instead of the startup control routine above, it is possible to further improve startup performance by opening the control valves 29, 30, 33, 34 simultaneously with the commencement of a startup operation at a temperature below freezing.

Figure 11:
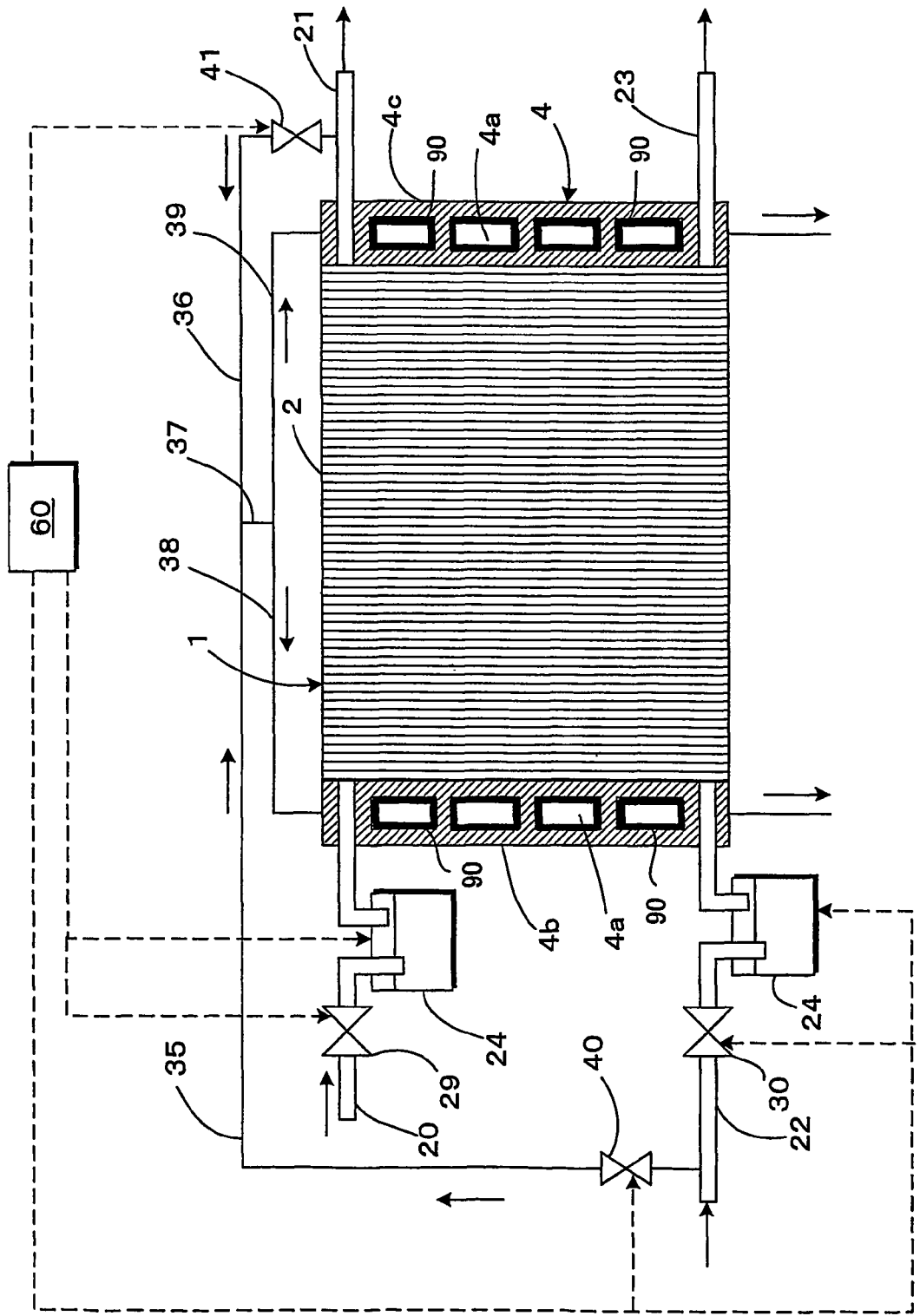
FIG. 11 is a schematic diagram of a fuel cell system according to an eleventh embodiment.

Referring to FIG. 11, an eleventh embodiment will be described. The fuel cell system comprises an anode intake pipe 20, an anode outlet pipe 21, a cathode intake pipe 22, a cathode outlet pipe 23 and two humidifiers 24. A control valve 29, 30 is disposed in each intake pipe upstream of the humidifier 24. A pipe 35 branching from the cathode intake pipe 22 upstream of the control valve 30 and a pipe 36 branching from the anode outlet pipe 21 joins together into the confluent-flow pipe 37. The confluent-flow pipe 37 branches again into a pipe 38 and a pipe 39. The pipes 38, 39 are respectively connected to the current extraction section 4b, 4c disposed on both ends of the fuel cell stack 2. A control valve 40 is disposed in the pipe 35 and a control valve 41 is disposed in the pipe 36. The control valves 40, 41 are opened and closed by the controller 60.

Figure 13:
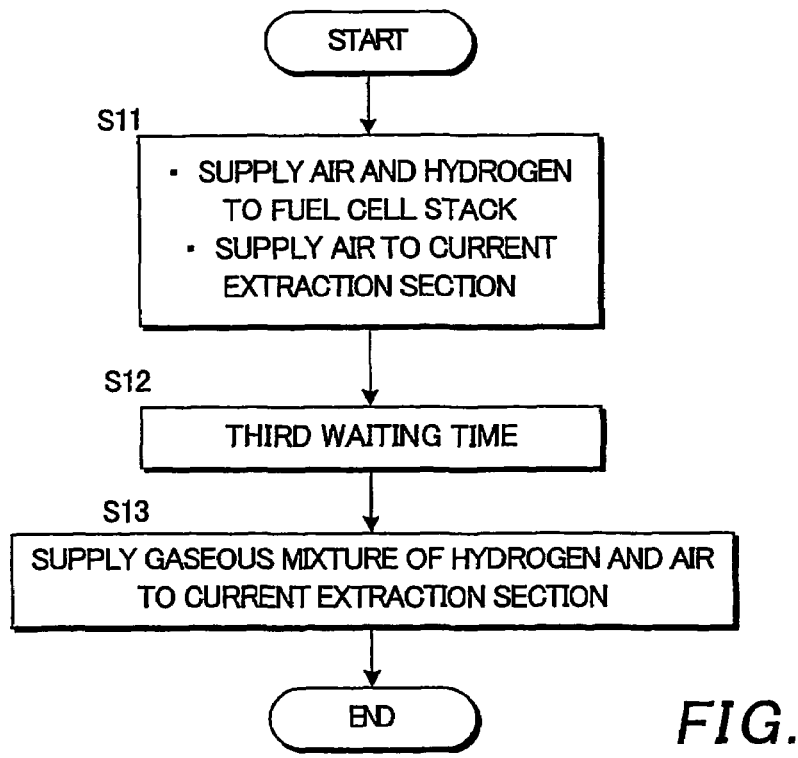
FIG. 13 is a flowchart describing an example of a startup control routine performed by a controller according to the eleventh embodiment.

Referring to FIG. 13, an example of a startup control routine executed by the controller 60 according to an eleventh embodiment will be described. Firstly in a step S11, the control valves 29, 30, 40 are opened so that air and hydrogen are supplied to the fuel cell stack 2 in order to commence power generation. Furthermore air is supplied to the current extraction section 4 through the pipes 35, 37, 38, 39. In a step S12, a third waiting time is set. For example, the third waiting time is the time until a stable air flow rate of 10 liters per minute is reached. In a step S13, the control valve 41 is opened. In this manner, hydrogen effluent from the anode of the cells in the fuel cell stack 2 is supplied from the pipe 36 to the pipe 37. Then, the gaseous mixture of air and hydrogen effluent is supplied to the current extraction section 4. The supply rate of hydrogen is of the order of 0.4 liters per minute. The end cell is heated by supplying a gaseous mixture to the current extraction section 4 which is combusted by the catalyst 90 applied to the passage 4a of the current extraction section 4. In addition to the effect obtained by the tenth embodiment, the eleventh embodiment allows hydrogen effluent to be used effectively.

During normal operation, moisture produced by the current extraction section 4 is discharged to the external atmosphere by closing the control valve 41 and holding the control valve 40 in the open position. Thus it is possible to prevent deterioration in the catalytic reaction of the catalyst 90 applied to the passage 4a as a result of moisture in the passage 4a freezing at a temperature below freezing.

In the fuel cell system according to the tenth and eleventh embodiments, an ignition device (combustion means) such as a spark plug for combustion of the gaseous mixture may be provided in order to combust the air and hydrogen. Thus the end cell may be heated by the supply of combustion gas to the current extraction section 4. Consequently, in this case, the catalyst 90 may not be applied to the passage 4a of the current extraction section 4. Thus it is possible to rapidly increase the temperature of the current extraction section 4 by providing the ignition device.

The entire contents of Japanese Patent Application P2003-123673 (filed Apr. 28, 2003) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

The invention claimed is:

1. A fuel cell assembly comprising:
    a fuel cell stack formed by laminating a plurality of cells;
    plus and minus current extraction sections, the current extraction sections extracting current generated by the fuel cell stack and sandwiching the fuel cell stack with respect to the direction of lamination, each current extraction section comprising a current extraction plate which is fixed to an end cell positioned on an end of the fuel cell stack so as to extract the generated current, and an end plate for uniformly binding the cells of the fuel cell stack; and
    a passage allowing flow of oxygen gas and hydrogen gas during startup of the fuel cell stack at a temperature below freezing, provided for at least one of the current extraction plate and the end plate, wherein a catalyst for combusting the gas is applied to a wall face of the passage and wherein the passage passes only the current extraction sections and does not supply the fuel cell stack with the oxygen gas and hydrogen gas.

2. The fuel cell assembly as defined in claim 1, wherein the passage for the gas is formed between the current extraction plate and the end plate.

3. The fuel cell assembly as defined in claim 1, wherein the passage is formed inside at least one of the current extraction plate and the end plate.

4. A fuel cell system comprising:
    a fuel cell assembly comprising;
        a fuel cell stack formed by laminating a plurality of cells;
        plus and minus current extraction sections, the current extraction sections extracting current generated by the fuel cell stack and sandwiching the fuel cell stack with respect to the direction of lamination, each current extraction section comprising a current extraction plate which is fixed to an end cell positioned on an end of the fuel cell stack so as to extract the generated current, and an end plate for uniformly binding the cells of the fuel cell stack;
        a passage allowing flow of a fluid during startup of the fuel cell stack at a temperature below freezing, provided for at least one of the current extraction plate and the end plate, wherein the passage passes only the current extraction section and does not supply the fuel cell stack with the fluid;
        a control valve which is open to supply the fluid to the passage during startup of the fuel cell stack and which is closed to stop supplying the fluid to the passage under normal conditions of the fuel cell stack after the startup; and
        a heating device for heating the passage for the fluid.

5. The fuel cell system according to claim 4, wherein the fluid is combustible and the heating device comprises a catalyst applied to the passage in order to combust the fluid.

6. The fuel cell system according to claim 4, wherein the heating device heats the fluid and supplies the heated fluid to the passage.

7. The fuel cell system according to claim 4, wherein the fluid is combustible and the heating device comprises an ignition device for combusting the fluid.

8. The fuel cell system according to claim 4, wherein the heating device heats at least one of the current extraction sections when the fuel cell stack is started up.

9. The fuel cell system according to claim 8, wherein the heating device comprises means for combusting cathode gas for the fuel cell stack and the heating device heats at least one of the current extraction sections using the heat of combustion.

10. The fuel cell system according to claim 8, wherein the heating device comprises means for combusting a gaseous mixture of cathode gas and anode gas for the fuel cell stack and the heating device heats at least one of the current extraction sections using the heat of combustion.

11. The fuel cell system according to claim 10, wherein the anode gas is an anode gas discharged from the fuel cell stack.

12. The fuel cell system according to claim 8, wherein the heating device comprises means for supplying anode gas for the fuel cell stack to the current extraction sections after supplying cathode gas for the fuel cell stack to the current extraction sections and means for combusting the gaseous mixture of anode gas and cathode gas.

13. The fuel cell system according to claim 12, wherein the anode gas is an anode gas discharged from the fuel cell stack.

14. The fuel cell system according to claim 4, wherein the passage for the fluid is formed between the current extraction plate and the end plate.

15. The fuel cell system according to claim 4, wherein the passage is formed in at least one of the current extraction plate and the end plate.

16. A fuel cell assembly comprising:
a fuel cell stack formed by laminating a plurality of cells;
plus and minus current extraction sections, the current extraction sections extracting current generated by the fuel cell stack and sandwiching the fuel cell stack with respect to the direction of lamination, each current extraction section comprising a current extraction plate which is fixed to an end cell positioned on an end of the fuel cell stack so as to extract the generated current, and an end plate for uniformly binding the cells of the fuel cell stack; and
an enclosed cavity for confining gas therein formed in at least one of the current extraction sections, the gas being sealed in the enclosed cavity at reduced pressure;
wherein the end plate is formed from a material which has a lower coefficient of thermal conductivity than a material for forming the current extraction plate.

17. The fuel cell assembly as defined in claim 16, wherein the enclosed cavity is formed between the current extraction plate and the end plate.

18. The fuel cell assembly as defined in claim 16, wherein the enclosed cavity is formed inside at least one of the current extraction plate and the end plate.

* * * * *